Feb. 11, 1958  G. W. BRUDERICK  2,822,649
PROFILE GRINDER
Filed Dec. 1, 1953  4 Sheets-Sheet 1
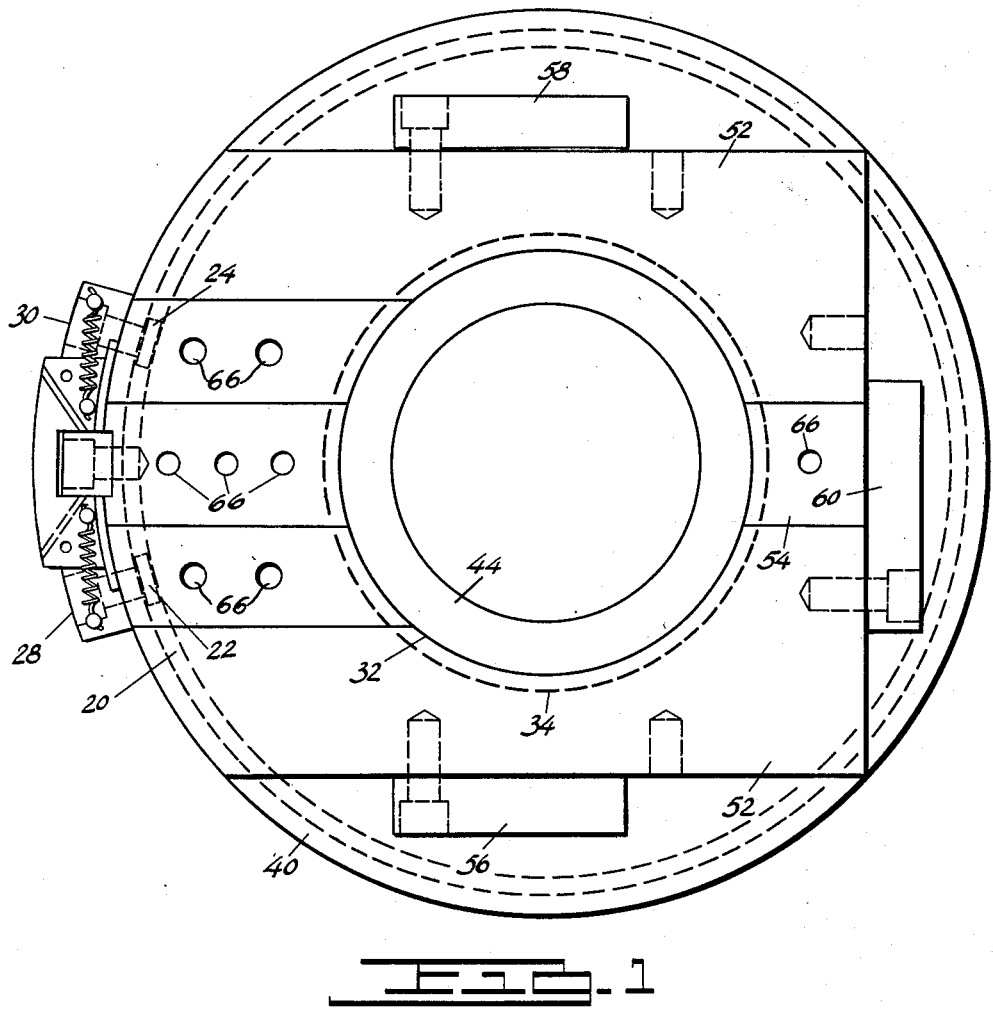
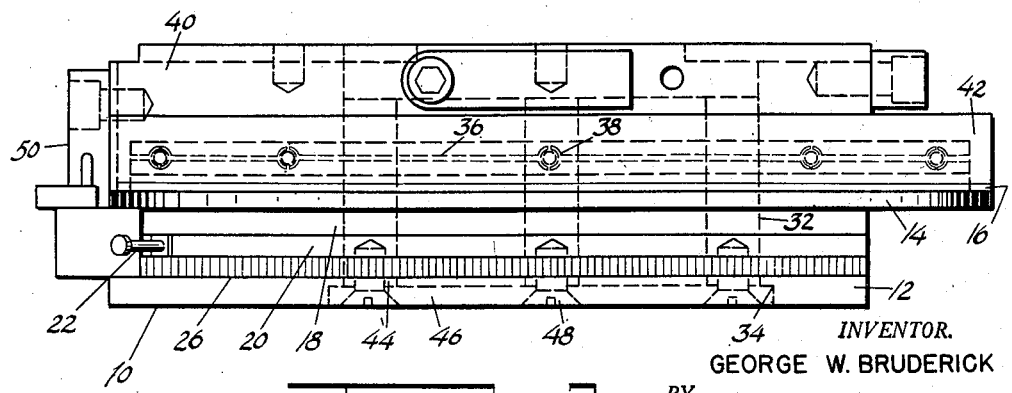
INVENTOR.
GEORGE W. BRUDERICK
BY
*C. H. Fowler*
ATTORNEY Feb. 11, 1958   G. W. BRUDERICK   2,822,649
PROFILE GRINDER
Filed Dec. 1, 1953   4 Sheets-Sheet 2
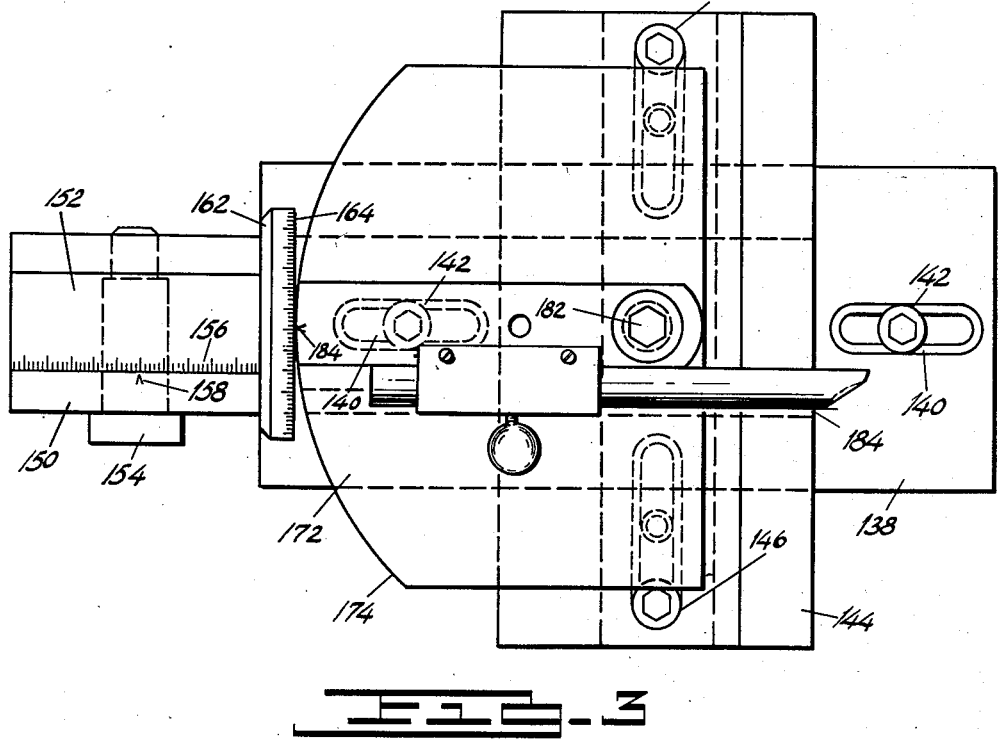
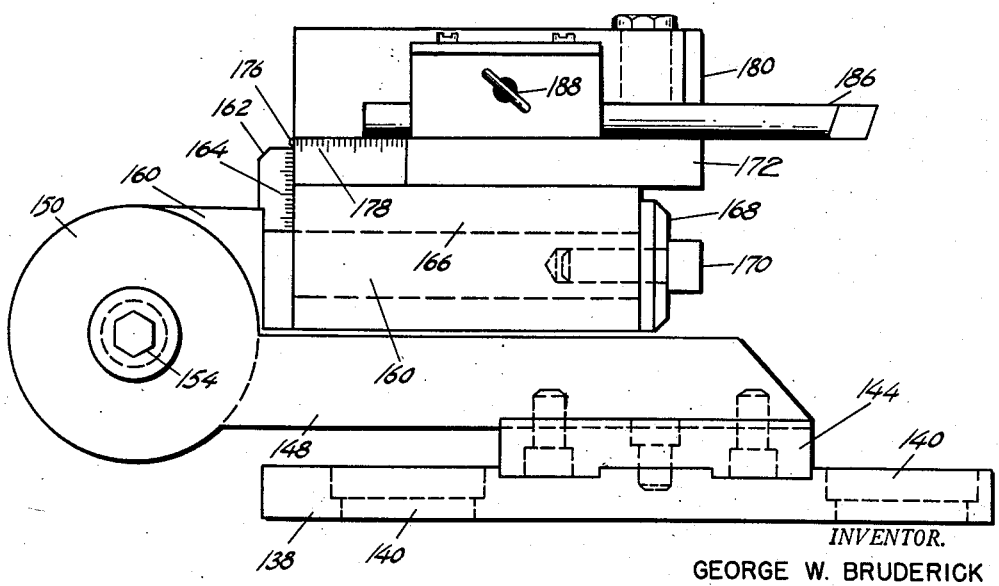
INVENTOR.
GEORGE W. BRUDERICK
BY
*O. H. Fowler*
ATTORNEY

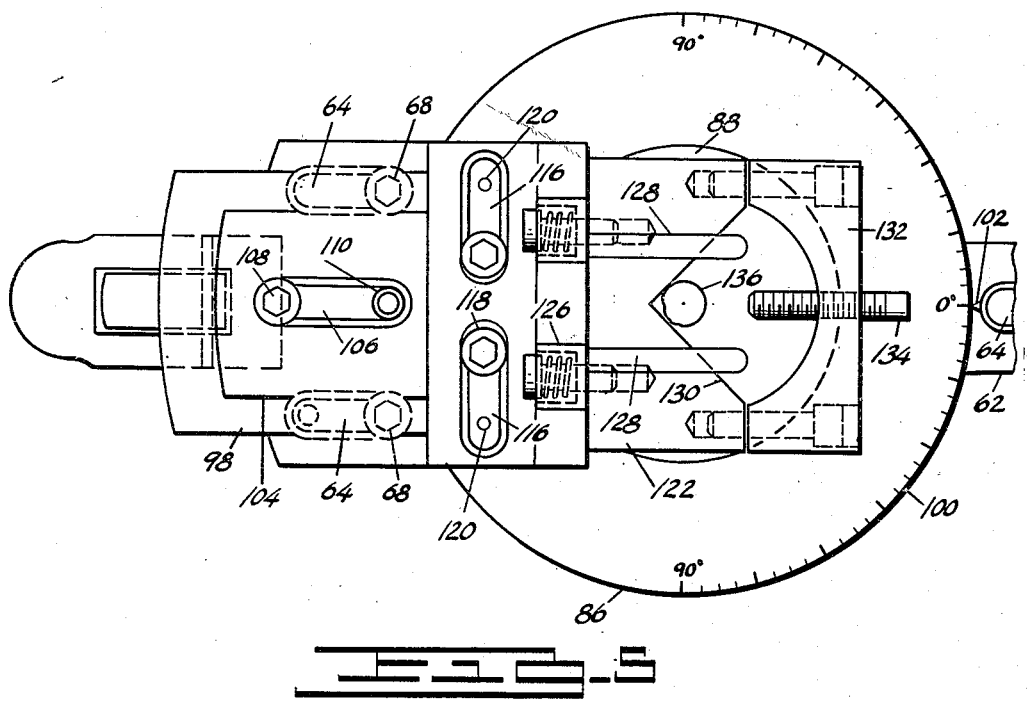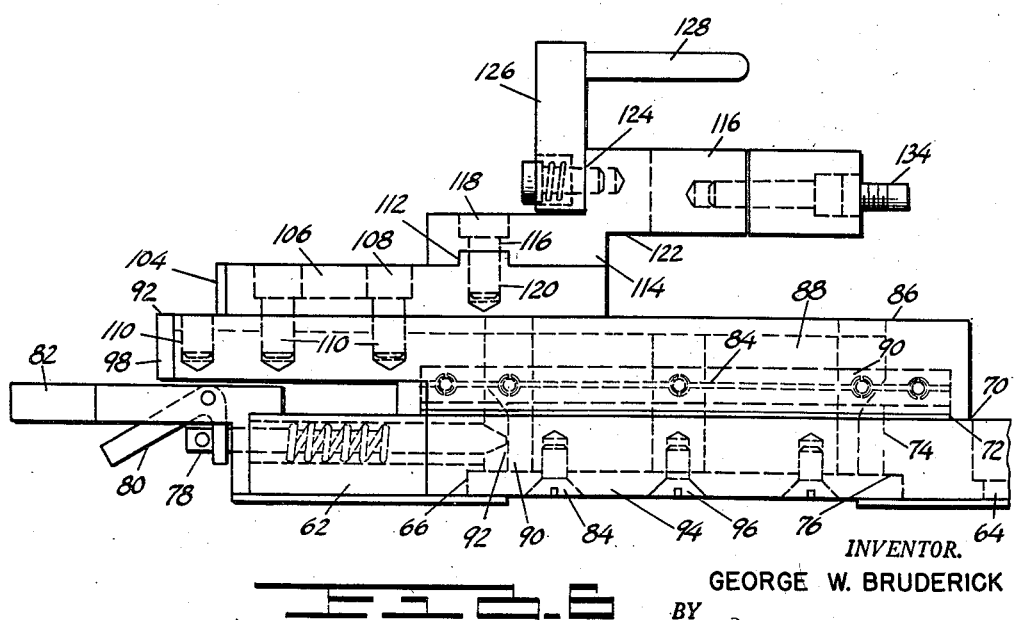

Feb. 11, 1958  G. W. BRUDERICK  2,822,649
PROFILE GRINDER
Filed Dec. 1, 1953  4 Sheets-Sheet 4
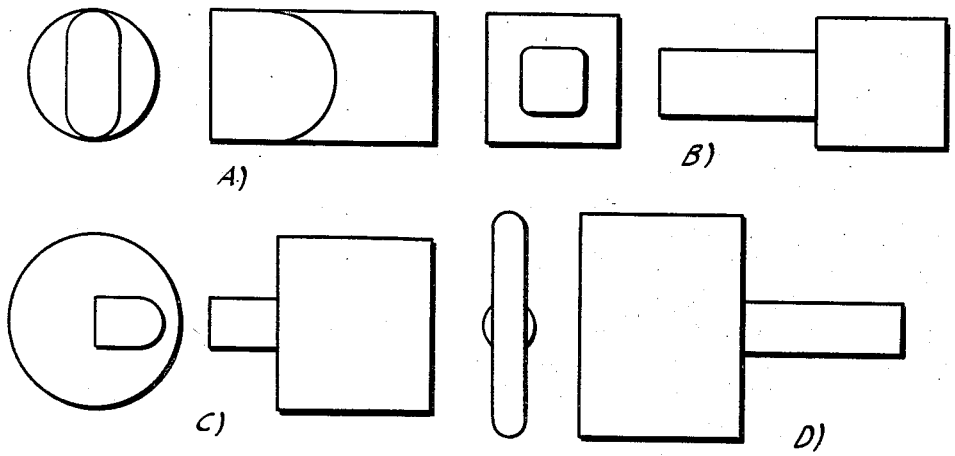
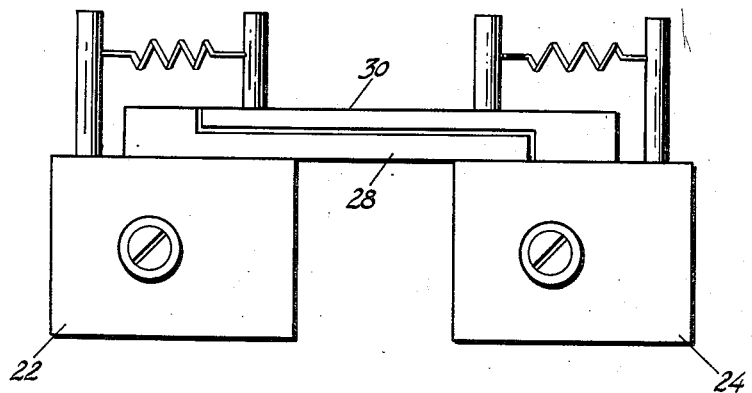
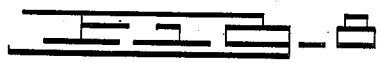
INVENTOR.
GEORGE W. BRUDERICK
BY
ATTORNEY

United States Patent Office 2,822,649
Patented Feb. 11, 1958

2,822,649

PROFILE GRINDER

George W. Bruderick, Detroit, Mich.

Application December 1, 1953, Serial No. 395,419

8 Claims. (Cl. 51—234)

This invention relates to grinding and more particularly, to an attachment for a surface grinding machine for the generation of various desirable profiles upon a work-piece.

An object of the invention is to provide a highly efficient apparatus for the generation of a group of contiguous arcuate and angular surfaces on a work piece.

Another object of the invention is to provide an apparatus for the generation of contiguous radii and angles by moving the work successively between spaced stops.

Another object of the invention is to provide an apparatus for the generation of contiguous radii and angles wherein positive maintenance of a constant angle between the work and the surface of the wheel is effected during generation of the different contours.

A further object of the invention is to provide an apparatus for the generation of angles and radii on a work piece wherein the apparatus may be adjusted to grind a selected group of angles and radii and positively locked so as to avoid error in the grinding of the work.

An additional object of the invention is to provide an apparatus of the character designated which will be fairly simple and inexpensive in structure, highly efficient in use, positive in action, durable in service and a general improvement in the art.

Further objects and advantages of the invention reside in the various combinations of structures hereinafter described and claimed as will be apparent upon reference to the following specification and to the accompanying drawings, in which:

Figure 1 is a top plan view illustrating one of the carriages;

Figure 2 is a side view of the structure shown in Figure 1;

Figure 3 is a top plan view illustrating the work supporting structure;

Figure 4 is a side elevation of the structure shown in Figure 3;

Figure 5 is a top plan view illustrating a modification;

Figure 6 is a side elevation of the structure shown in Figure 5;

Figure 7 illustrates a variety of forms that may be ground, and

Figure 8 is an enlarged detail view of the dogs supported on the stops.

Referring to the drawings for more specific details of the invention, 10 indicates a base plate adapted to be seated on a magnetic clutch, not shown, of a conventional surface grinding machine. Preferably, the base has a rectangular bottom 12 and a circular top 14 provided with a circumferential shoulder 16 and one edge of the bottom is arced as at 18 to conform with the circumference of the top. The arcuate portion 18 has a circumferentially disposed T-shaped slot 20 for the reception of adjustable stops 22 and 24 movable along a calibration 26 arranged adjacent the slot. The stops 22 and 24 carry spring pressed dogs 28 and 30 the purpose of which will hereinafter appear, and the base has an opening 32 concentrically disposed with relation to the top 16 and the wall defining the opening has an inner circumferential shoulder 34.

An annular bearing race 36 on the circular top 14 carries spaced ball bearings 38 supporting a rotatable annular carriage 40 having a circumferential flange 42 received by the annular shoulder 16 on the top 14, and a concentrically disposed sleeve 44 extended through the bearing race 36 and received by the opening 32 in the base. A ring 46 seated on the shoulder 34 of the base and suitably secured to the sleeve 44 as by machine screws 48 serves to retain the carriage 40 against displacement.

The carriage 40 has fixedly secured thereto a downwardly extended pointer 50 positioned between the adjustable stops 22 and 24 for cooperation therewith and movable over the calibration 26 when the carriage 40 is rotated on the bearings 38.

The top of the rotatable carriage 40 is machined so as to provide corresponding spaced guides 52 having a runway 54 therebetween diametrally of the carriage 40 and gauges or stops 56, 58 and 60 are pivotally supported on the guides and are reversible.

A platform 62 slidable on the runway 54 between the guides 52 is provided with spaced slots 64 registering with taps 66 in the carriage 40 for the reception of set screws 68. This structure affords suitable adjustment of the platform 62 diametrally of the carriage 40.

The platform 62 adjustable diametrally on the rotatable carriage 40, has an annular top plate 70 providing in conjunction with the platform 62 an annular shoulder 72, and an opening 74 having an inner circumferential shoulder 76. A spring-pressed plunger 78 mounted for reciprocation in the platform extends into the opening 74 and a lever 80 pivotally supported on a handle 82 on the edge of the platform controls the plunger.

A ring bearing 84 supported on the annular top plate 70 receives a secondary rotatable carriage 86 having an opening 88 registering with the opening in the platform 62 and a sleeve 90 received by the opening 74 in the platform 62 and the sleeve 90 has notches 92 for the reception of the plunger 78. A ring 94 seated on the shoulder 76 and secured to the sleeve 90 as by screws 96 serves to retain the secondary carriage 86 against displacement.

The secondary carriage 86 is circular in general contour and supports a radially extended plate 98, and arranged on the circular portion is a scale 100 for cooperation with a pointer 102. A secondary platform 104 slidable longitudinally of the plate 98 and diametrally with reference to the secondary carriage 86, has spaced slots 106 for the reception of machine bolts 108 received by spaced taps 110 in the plate 98 so as to afford adjustment of the secondary platform 104.

The secondary platform 104 has a transverse rib 112 and a tertiary platform 114 slidable thereon has spaced slots 116 for the reception of machine bolts 118 received by taps 120 in the rib 112 so that the tertiary platform may be adjusted. The tertiary platform 114 has an off-set portion or arm 122 providing a shoulder 124 having pivotally supported thereon centering devices including spaced spring-pressed arms 126 supporting laterally extended fingers 128 in parallel relation to one another. The off-set portion 122 of the plate 114 has a V-notch 130 and a yoke 132 straddling the notch carries a set screw 134 for clamping a work piece 136 in the notch.

For shaping bits the slidable secondary platform 104 and superstructure thereon is removed and replaced by a slidable secondary platform 138 having slots 140 for the reception of machine bolts 142 for the purpose of adjustment and a tertiary platform 144 slidable transversely of the secondary platform 134 and adjustable thereon as by machine bolts 146 supports an arm 148 supporting a bifurcated bearing 150 receiving a hub 152 journalled therein. The hub is calibrated as at 156 and a vernier 158 is arranged on the bearing for cooperation with the calibration so as to indicate the angular positon of the hub. A shaft 160 extended from the hub has thereon a flange 162 calibrated as at 164, and a sleeve 166 rotatable on the shaft and held against displacement by a washer 168 and a bolt 170 threaded in the free end of the shaft. The sleeve 166 has thereon in tangential relation thereto a table 172 provided with an arcuate edge 174. A pointer 176 on the table approximately centrally of the curved edge 104 cooperates with the calibration 164 to indicate the angular position of the table and a calibration 178 is arranged on the arcuate edge of the table 172. A heavy arm 180 pivotally supported on the table 172 as by a bolt 182 has on its free end a pointer 184 for cooperation with the calibration 178 to indicate the angular position of the pivoted arm with relation to the table 172, and a tool 186 to be shaped is suitably held against the table 172 and arm 180 as by a set screw 88.

Assuming that the apparatus is properly positioned on the magnetic clutch of a conventional surface grinding machine, the carriage 40 is then rotated to set the pointer 50 at zero on the scale 26 where it is retained and/or locked against displacement by the dogs 28 and 30. The secondary carriage 86 is then rotated to the position where the zero on the scale 100 registers with the pointer 102, in which position the secondary carriage 86 is locked by the plunger 78 seating in one of the notches 92 in the sleeve 90.

With the carriages 40 and 86 in the positions hereinabove indicated, the operator selects the profile he desires to grind. As for example, should the operator elect the type illustrated at A, Figure 7, he selects a workpiece, preferably round stock such as is shown and inserts it in the holder 130 where it is held against displacement by the set screw 134. The workpiece is then ground to provide parallel faces equispaced from the diameter of the piece, or the workpiece may be preground to provide such faces.

The arms 128 are then swung to engage the workpiece so as to center the piece in the holder. The gauges 56, 58 and 60 are then turned up and the platforms 104 and 114 adjusted so as to center the work in equi-distances from the parallel faces and one end of the profile. The plunger 78 is then retracted and the secondary carriage 86 turned one hundred and eighty degrees and the plunger released so as to engage one of the notches 92 in the sleeve 90.

Then the operator retracts the plunger 78 and swings the carriage 86 back and forth 180 degrees, i. e., 90 degrees on each side of zero on the scale 100, at the same time moving the workpiece into engagement with the wheel. This completes one end of the profile. The operator then adjusts the stops 28 and 30 ninety degrees each from zero on the scale 26, thus providing for a 180 degree swing of the carriage 40, and upon swinging the carriage 40 and at the same time moving the workpiece into engagement with the grinding wheel, a radius is formed on the other end of the profile.

From the foregoing, it is clear that various angles of radii may be ground.

The attachment illustrated in Figures 3 and 4 may be substituted for the platforms 104 and 114. This embodiment is highly desirable when grinding tool bits with a diamond wheel.

The apparatus hereinabove described is of great value in grinding punches such as illustrated in Fig. 7. The different types of profiles A, B, C and D represent only a few of the varied types which may be ground satisfactorily when use is made of the incident apparatus.

In operation, assuming that the carriages 40 and 86 are on dead center, and that a bit blank has been secured in the holder, the screw 154 is backed off and the arm 160 is raised 7 degrees on the scale 156, and secured against displacement by the screw 154. Then back off screw 170 and tilt the table 172 7 degrees and secure in place. Then turn the gauge 60 up and slide the platform 138 so that the tip of the blank will be .380" plus grinding stock from the center of the fixture. Then release the plunger 78 and swing the carriage 86 seventy degrees counterclockwise. Then adjust the platform 144 to meet the same dimension as with the tip of the bit. Then adjust the stop 28 seventy degrees on the scale 26. The operator then moves the work through the medium of the table into engagement with the wheel and rotates the carriage 40 to effectively grind the bit. This operation will effectively grind a .380" radius on the tip of the bit.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the invention, what I claim as new and desire to secure by Letters Patent is:

1. An apparatus of the class described comprising a flat base, a carriage supported for rotation on the top of the base, stops adjustable on the base for limiting rotation of the carriage, dogs for locking the carriage against rotation, a platform slidable diametrally of the carriage, set-screws for securing the platform against movement, a secondary carriage rotatably supported on the top of the platform, a spring pressed plunger for locking the secondary carriage in any one of a plurality of positions, a secondary platform slidable diametrally of the secondary carriage, set-screws for securing the secondary platform against movement, a tertiary platform slidable transversely of the secondary platform, and a holder for a workpiece on the tertiary platform.

2. An apparatus of the class described comprising a flat base, a carriage supported for rotation on the top thereof, a scale on the base, a pointer on the carriage for cooperation with the scale, a platform slidable diametrally of the carriage, a secondary carriage supported for rotation on the top of the platform, a plunger carried by the platform for locking the secondary carriage in any one of a plurality of positions, a top of the secondary platform slidable diametrally on the secondary carriage, set-screws for securing the secondary platform in adjusted position, a tertiary platform slidable transversely of the secondary platform, an off-set arm on the tertiary platform, and a holder for a workpiece on the off-set arm.

3. An apparatus of the class described comprising a flat base having a peripheral T slot, stops adjustable therein and a scale adjacent the slot, a carriage rotatable on the top of the base, a pointer on the carriage cooperating with the stops and scale, gauges on the top of the carriage, a platform slidable diametrally on the carriage, set-screws for securing the platform against movement, a secondary carriage rotatable on the top of the platform, a spring pressed plunger carried by the platform for locking the secondary carriage in any one of a plurality of positions, a secondary platform slidable diametrally on the top of the secondary carriage, set-screws for securing the secondary platform against movement, a tertiary platform slidable transversely on the top of the secondary platform, set-screws for securing the tertiary platform against movement, an off-set arm on the tertiary platform in parallel relation to the secondary platform, spaced centering devices on the arm, and a holder for a workpiece on the arm.

4. In an apparatus of the class described, a base plate having a flat top and a concentrically disposed opening, a carriage supported for rotation on the top having a concentrically disposed opening registering with the opening in the base, a sleeve on the carriage received by the opening in the base, a platform slidable on the carriage having an opening normally registering with the opening in the carriage, a secondary carriage supported for rotation on the top of the platform having a concentrically disposed opening, a sleeve on the carriage received by the opening in the platform, a secondary platform slidable on the top of the secondary carriage, a tertiary platform slidable transversely of the secondary platform, and a holder for a workpiece on the tertiary platform overhanging the openings in the base, carriages and platforms.

5. In an apparatus of the class described, a base having a flat circular top and an axial opening therethrough, a carriage supported for rotation on the top of the base having an opening therethrough, an axially disposed sleeve on the carriage received by the opening in the base, stops adjustable on the base for limiting rotation of the carriage, dogs for locking the carriage against rotation, a platform slidable diametrally of the carriage having an opening therethrough normally registering with the opening in the carriage set-screws for holding the platform against movement, a secondary carriage supported for rotation on the top of the platform having an axial opening therethrough registering with the opening in the platform, an axially disposed sleeve on the secondary carriage received by the opening in the platform, a spring pressed plunger carried by the platform and cooperating with the sleeve on the secondary carriage for locking the secondary carriage in any one of a plurality of positions, a secondary platform slidable diametrally of the secondary carriage having an axial opening normally registering with the opening in the secondary carriage, set-screws for holding the secondary platform against movement, a tertiary platform slidable transversely of the secondary platform and a holder for a workpiece overhanging the openings in the base, carriages and platforms.

6. In an apparatus of the class described, a base having a flat circular top and an axial opening through the top and base, a carriage supported for rotation on the top having an axial opening therethrough, an axially disposed sleeve on the carriage received by the opening in the base, a scale on the base, a pointer on the carriage cooperating with the scale, a platform slidable diametrally of the carriage having an opening therethrough normally registering with the opening in the carriage, a secondary carriage supported for rotation on the top of the platform having an opening therethrough registering with the opening in the platform, an axially disposed sleeve on the secondary carriage received by the opening in the platform, a manually controlled plunger carried by the platform and cooperating with the sleeve for locking the secondary carriage in any one of a plurality of positions, a secondary platform slidable diametrally on the top of the secondary carriage, set-screws for holding the secondary platform in adjusted position, a tertiary platform slidable transversely of the secondary platform, an offset arm on the tertiary platform and a holder for a workpiece on the offset arm overhanging the openings through the base, the carriages and platforms.

7. In an apparatus of the class described, a base having a flat circular top and an opening therethrough, a guide way in the base, stops adjustable in the guide way, a scale adjacent the guide way, a carriage supported for rotation on the circular top having an axial opening therethrough, an axially disposed sleeve on the carriage received by the opening in the base and circular top, a pointer on the carriage cooperating with the stops, adjustable gauges on the carriage, a platform slidable diametrally on the carriage having an opening therethrough normally registering with the opening in the carriage, means for securing the platform against movement, a secondary carriage supported for rotation on the top of the platform having an opening registering with the opening in the platform, a sleeve disposed axially on the secondary carriage and received by the opening in the platform, a manually controlled plunger carried by the platform and cooperating with the sleeve on the secondary carriage for locking the secondary carriage in any one of a plurality of positions, a dial on the secondary carriage for indicating the position thereof, a secondary platform slidable diametrally on the top of the secondary carriage, set-screws for holding the secondary platform in adjusted position, a tertiary platform slidable transversely on the top of the secondary platform, set-screws for holding the tertiary platform in adjusted position, an offset arm on the tertiary platform, spaced centering devices on the arm, and a holder for a workpiece on the arm overhanging the openings in the base, the carriages and the platforms.

8. In an apparatus of the class described, a base having a flat circular top and an opening extended through the base and top, a peripherial guide way on the base, a scale adjacent the guide way, stops adjustable in the guide way, a carriage supported for rotation on the circular top having an axial opening, an axially disposed sleeve on the carriage received by the opening through the base and circular top, means for retaining the sleeve against axial displacement, a pointer carried by the carriage co-operating with the scale and stops, gauges adjustable on the carriage, a platform slidable diametrally on the carriage having an opening normally registering with the opening in the carriage, means for securing the platform against movement, a secondary carriage supported for rotation on the top of the platform having an opening therethrough registering with the opening in the platform, an axially disposed sleeve on the secondary carriage received by the opening in the platform, means for retaining the sleeve against axial displacement, a spring pressed plunger carried by the platform and cooperating with the sleeve on the secondary carriage for locking the secondary carriage in any one of a plurality of positions, a scale on the secondary carriage for indicating the position thereof, a plate extended radially from the secondary carriage, a secondary platform slidable on the plate in diametrical relation to the secondary carriage, means for securing the secondary platform in adjusted position, a tertiary platform slidable transversely on the top of the secondary platform, means for securing the tertiary platform in adjusted position, an offset arm on the tertiary platform in parallel relation to the secondary platform, spaced centering devices on the arm, and a holder for a workpiece on the arm overhanging the opening in the secondary carriage.

References Cited in the file of this patent

UNITED STATES PATENTS

| | | |
|---|---|---|
| 1,256,794 | Hanton | Feb. 19, 1918 |
| 1,783,540 | Hogg et al. | Dec. 2, 1930 |
| 1,807,999 | McMurty | June 2, 1931 |
| 2,480,618 | Tresidder | Aug. 30, 1949 |